Nov. 1, 1938.   J. L. LORBESKI   2,135,347
VEHICLE
Filed Oct. 14, 1937   2 Sheets-Sheet 1
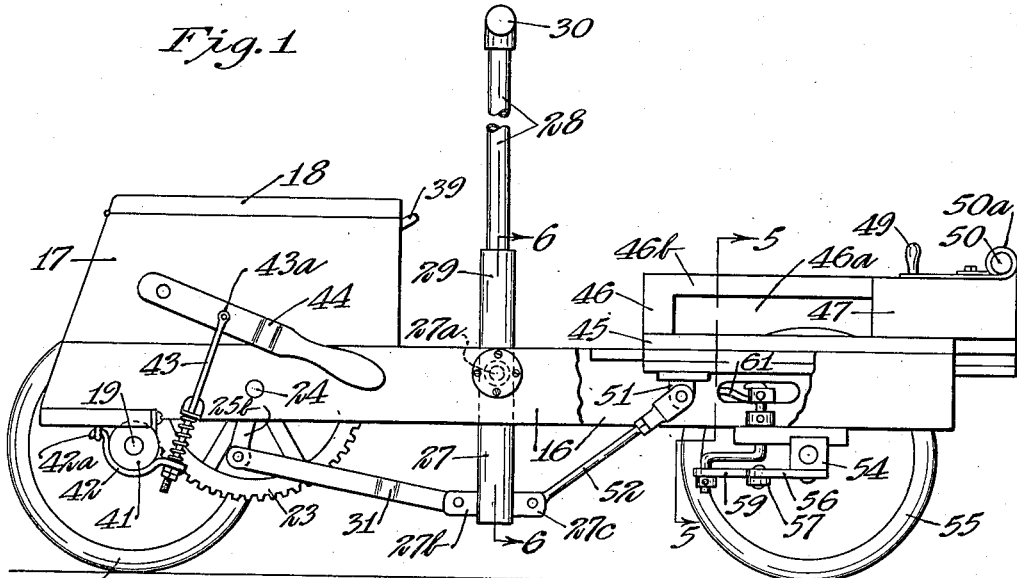
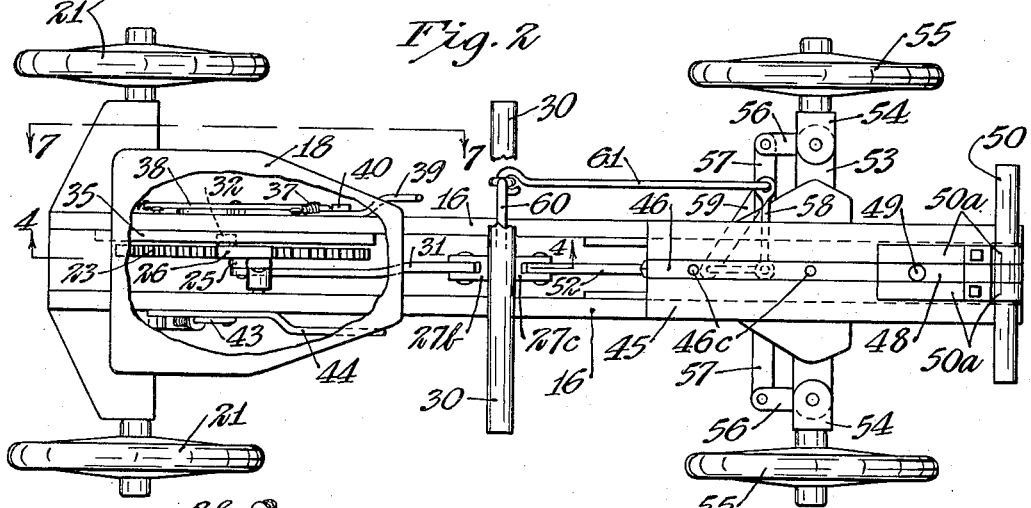
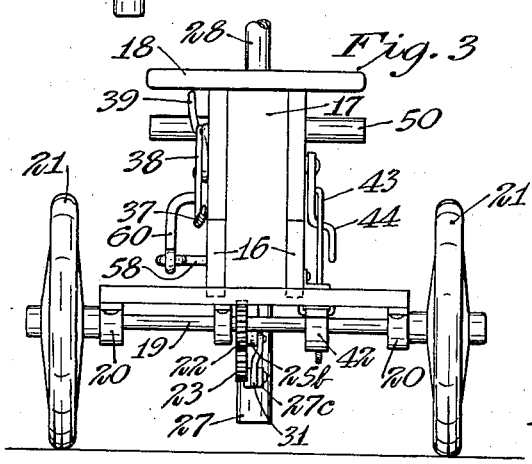
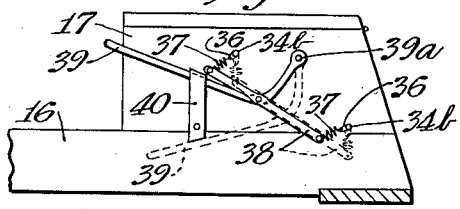
Inventor
John L. Lorbeski
By Williamson & Williamson
Attorneys Nov. 1, 1938.   J. L. LORBESKI   2,135,347
VEHICLE
Filed Oct. 14, 1937   2 Sheets-Sheet 2
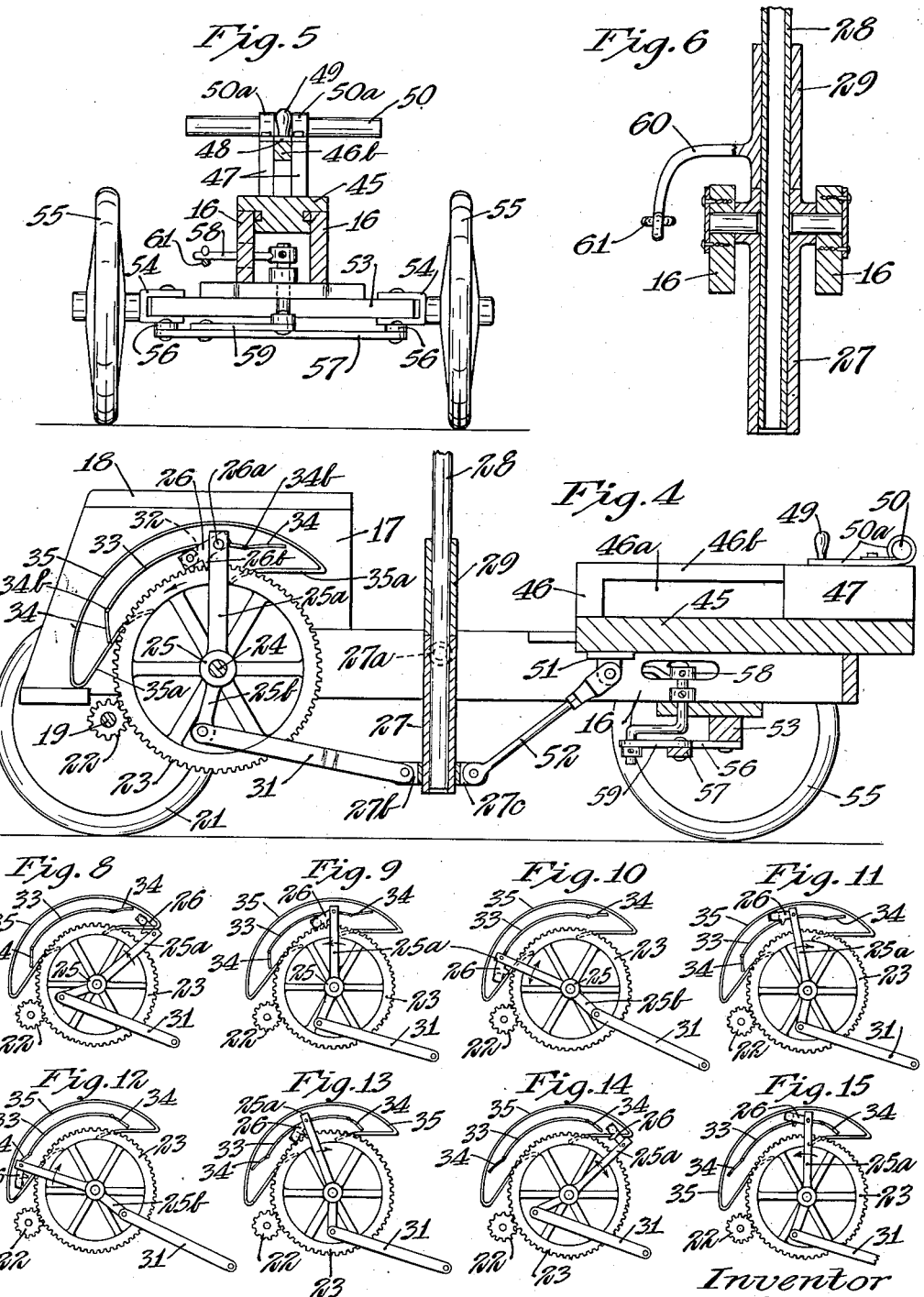

Patented Nov. 1, 1938

2,135,347

UNITED STATES PATENT OFFICE 2,135,347

VEHICLE

John L. Lorbeski, Minneapolis, Minn.

Application October 14, 1937, Serial No. 168,925

3 Claims. (Cl. 74—151)

My invention relates to vehicles and particularly to vehicles propelled by the muscular efforts of occupants thereof.

A general object of my invention is to provide an improved vehicle adapted to be propelled and steered by an occupant thereof with convenience and economy of muscular effort.

A more specific object is to provide such a vehicle wherein force for propelling the same may be cooperatively applied by the hands and feet of an occupant of the vehicle.

Another object is to provide such a vehicle having transmission mechanism permissive of coasting of the vehicle with the hand and foot operated propelling elements thereof not in motion.

Still another object is to provide such a vehicle wherein the hand operated propelling element thereof functions also as a steering element.

A further object is to provide such a vehicle of light, compact, rugged, simple and inexpensive construction.

These and other objects and advantages of the invention will more fully appear from the following description made in connection with the accompanying drawings wherein like reference characters refer to the same or similar parts throughout the views, and in which:—

Fig. 1 is a partially broken-away, partially sectional side view of an embodiment of my invention;

Fig. 2 is a partially broken-away top view;

Fig. 3 is a rear view;

Fig. 4 is a vertical sectional view taken along the line 4—4 of Fig. 2 as indicated by the arrows;

Fig. 5 is a vertical sectional view taken along the line 5—5 of Fig. 1 as indicated by the arrows;

Fig. 6 is a sectional view taken along the line 6—6 of Fig. 1 as indicated by the arrows;

Fig. 7 is a vertical sectional view taken along the line 7—7 of Fig. 2 as indicated by the arrows;

Figs. 8-11 inclusive, are a series of views of the transmission mechanism of my vehicle illustrating steps in the operation thereof for forward propulsion of the vehicle, and Figs. 12-15 inclusive, are a series of views of the transmission mechanism of my vehicle illustrating steps in the operation thereof for rearward propulsion of the vehicle.

Referring to the drawings, my vehicle includes a frame which may consist of a pair of parallel longitudinal members 16. At the rear portion of the frame a housing or box 17 is provided carrying thereon a seat 18. The vehicle is provided with a rear axle shaft 19 rotatably mounted thereon by means of bearings 20. On the outer ends of the rear axle shaft 19 are respective wheels 21, as least one of which is secured to the axle shaft 19 for rotation therewith. A gear 22 is mounted on the medial portion of the shaft 19 and is meshed with a somewhat larger gear 23 partially housed within the box 17 and mounted on a shaft 24 which is journalled in suitable apertures in the frame members 16. A lever 25 is rotatably mounted on the shaft 24 closely adjacent the gear 23 and is provided with an upwardly projecting arm 25a and a generally downwardly projecting arm 25b. The free end of the upwardly projecting arm 25a is provided with an element 26 pivotally connected thereto as at 26a so as to be shiftable upwardly and downwardly. The element 26 carries thereon a pawl or tooth 26b adapted for engagement with the teeth of the large gear 23. Obviously the element 26 may be swung inwardly to bring the tooth 26b into engagement with the gear 23 and outwardly disengage the tooth 26b from the gear 23. Also it should be apparent that the lever 25 is adapted for angular oscillatory movement and that the gear 23 will move in the same manner as the lever 25 at all times when the tooth 26b is engaged with the gear 23.

Means accessible to an occupant of the seat 18 is provided for oscillating the lever 25. A hollow, somewhat elongated element 27 is pivotally mounted at its medial portion on the frame members 16 as at 27a. An operating lever 28 is socketed at its lower portion within the hollow element 27 so as to be rotatable therewithin. The operating lever 28 is provided with a collar 29 mounted thereon above the top of the hollow element 27 so as to limit downward movement of the operating lever 28 relative to the hollow element 27. The upper end of the operating lever 28 is provided with a handle 30 disposed at right angles thereto and mounted at its medial portion thereon. Obviously forward and rearward movement of the handle 30 will cause angular oscillation of the hollow element 27. The hollow element 27 has at its lower end a rearwardly projecting lug 27b connected through a link 31 to the free end of the lower arm 25b of the lever 25. It should be apparent that forward and rearward movement of the handle 30 will cause angular oscillation of the lever 25.

Means is provided whereby the tooth 26b will be engaged with the gear 23 during movement of the arm 25a in one direction and will be disengaged from the gear 23 during movement of the arm 25a in the other direction so that oscillatory movement of the arm 25a will result in unidirectional rotation being imparted to the gear 23 so as to rotate one of the wheels 21 and thus propel the vehicle. The shiftable element 26 has a follower thereon which may be in the form of a roller 32. The inner side of one of the walls of the box 17 is provided with a guide member 33 of arcuate shape and disposed parallel to the periphery of the upper portion of the gear 23. The guide member 33 is adapted for movement of the follower roller 32 along the outer side thereof, at which time the tooth 26b will be held out of engagement with the gear 23, or along the inner side thereof, at which time the tooth 26b will be in engagement with the gear 23. Means is provided at the respective ends of the guide member 33 to shift the follower roller 32 from one side to the other of the guide member 33 so that oscillation of the arm 25a will result in the follower 32 moving in one direction at the outer side of the guide member 33 and in the other direction at the inner side of the member 33 so as to circumscribe the member 33. At each end of the member 33 a guide element 34 is provided extending beyond the end of the member 33 so as to constitute in effect an extension thereof, and being pivotally mounted at its inner end so as to be swingable. A strip 35 of material is bent so that one portion thereof is spaced outwardly from and is parallel to the guide member 33 and extends a substantial distance beyond each end of the guide member 33, and other portions extend from the ends of the first portion toward each other and somewhat inwardly so as to provide inclined elements 35a positioned to deflect the follower 32 outwardly as the arm 25a approaches each end of its angle of oscillation and thereby disengage the tooth 26b from the gear 23. The strip 35 and the inclined portions 35a thereof function as stops to limit the angle through which the guide elements 34 may be swung.

Means is provided for holding one of the guide elements 34 in its inwardly deflected position and the other of the guide elements 34 in its outwardly deflected position, such means being yieldable to permit deflection of the guide elements 34, whereby the follower 32 may force its way therepast. It should be apparent that as the arm 25a is oscillated to move the follower 32 between respective positions close to the ends of the strip 35 that the follower 32 will force its way past the guide elements 34 and on its return trip will be deflected by the guide element to the opposite side of the guide member 33 from the side at which the guide element was disposed previously. Continuation of this action will, of course, cause the follower 32 to travel in one direction at the inner side of the guide member 33 so as to engage the tooth 26b with the gear 23 and in the other direction at the outer side of the guide member 33 so as to maintain the tooth 26b out of engagement with the gear 23.

Means is provided whereby the guide elements 34 may be reversed as to the direction of deflection of the respective ones thereof. Each guide element 34 is carried at its inner end by a pivot 34b which is journalled in a suitable aperture in a wall of the box 17 and extends to a point outwardly of that wall. Exteriorly of the box 17 each of the pivots 34b is provided with a small arm 36. The arms 36 are connected through tension springs 37 to a bar 38 as shown in Fig. 7. The bar 38 is shiftable longitudinally and in one shifted position will so dispose the springs 37 relative to the arms 36 that a first one of the guide elements 34 will be deflected inwardly and the second one outwardly, and in a second shifted position will so dispose the springs 37 that the first guide element 34 will be deflected outwardly and the second guide element 34 inwardly. With the bar 38 in one of its shifted positions, it will be seen that the tooth 26b will be engaged with the gear 23 during one direction of movement of the arm 25a and when the bar 38 is in the other of its shifted positions the tooth 26b will be engaged with the gear 23 during the opposite direction of movement of the arm 25a. Means is provided for shifting the bar 38 and holding the same in its respective shifted positions. A lever 39 bent into substantially an L-shape is pivotally connected at its inner end 39a to the box 17 and is pivotally connected at the bend in the lever 39 to the medial portion of the bar 38. A block 40 is provided so that the lever 39 may be placed in abutment with the respective ends of the block 40 when the lever 39 is in its respective shifted positions. It should be apparent that the lever 39 constitutes a manually operatable means for selectively arranging the transmission mechanism of my vehicle for respective forward and rearward propulsion of the vehicle. Figs. 8 to 11 illustrate the parts of the transmission mechanism in various positions thereof when the lever 39 is in its upper position as shown in full lines in Fig. 7. If the lever 39 is in its upper position, the parts of the transmission mechanism will move through the various positions thereof illustrated in Figs. 8 to 11 to propel the vehicle in a forward direction. Figs. 12 to 15 inclusive, correspond to the arrangement of the transmission mechanism when the lever 39 is in its lower position as shown in dotted lines in Fig. 7. Figs. 12 to 15 inclusive, show the parts of the mechanism in various positions through which these parts move in propelling the vehicle rearwardly.

Brake means is provided to facilitate stopping of the vehicle. A brake drum 41 is mounted on the rear axle shaft 19. A brake band 42 is connected at one end 42a thereof to the frame of the vehicle and at the other end is connected to a rod 43 which is in turn connected at 43a to a brake lever 44, swingably mounted on one side of the box 17.

Means is provided whereby the force applied by a user of the vehicle to the handle 30 for propelling the vehicle may be augmented by force applied by the feet of the user. A slide member 45 is mounted on the forward portion of the longitudinal frame member 16 for forward and rearward sliding movement relative thereto. A forwardly and rearwardly extending, upwardly projecting member 46 is mounted on the slide member 45 and is cut away at the lower part of the medial portion thereof as at 46a to leave a rectangular bar-like portion 46b spaced above the slide member 45. A member 47, having a longitudinal groove in its upper portion, is placed on the slide member 45 with the bar-like portion 46b disposed in the groove thereof so that the member 47 is shiftable forwardly and rearwardly relative to the members 45 and 46. A horizontal cross-bar 50, adapted for placement of the feet of a user of the vehicle thereon, is mounted on the forward portion of the member 47 and is secured thereto by means of clips 50a attached to the member 47 at respective sides of the groove therein. To enable locking of the cross-bar 50 in adjustively shifted positions relative to the slide member 45 to suit users of various proportions an element 48 is swingably mounted at its forward end on the medial portion of the cross-bar 50 and carries at its free end a stop pin 49 projecting both above and below the member 48 and engageable in any desired one of a series of recesses 46c in the upper side of the member 46. It should be apparent that the grooved member 47 may be placed in different positions on the member 46 and locked in any selected one of such positions by engaging the lock pin 49 in a suitable one of the apertures 46c. The slide member 45 is provided at the lower side of the rear portion thereof with a lug 51 which is connected through a link 52 with a lug 27c mounted on the forward side of the lower portion of the oscillatable hollow member 27. It should be readily seen that application of force on the handle 30 by the hands of the user and on the cross bar 50 by the feet of the user will cooperatively act to propel the vehicle.

My vehicle is provided with a front axle 53 having steering knuckles 54 on the respective ends thereof. Each of these steering knuckles 54 carries a front wheel 55 rotatably mounted thereon and includes a rearwardly projecting steering arm 56. The respective steering arms 56 are connected together by a drag link 57 disposed parallel to the front axle 53.

Means is provided whereby manipulation of the handle 30 to rotate the elongated element 28 in the hollow oscillatable member 27 may be employed to steer my vehicle. A bell crank 58 is mounted in the forward portion of the vehicle a short distance behind the front axle 53. The bell crank 58 is disposed in a horizontal plane with one arm thereof extending rearwardly and connected through a link 59 to the drag link 57. The other arm of the bell crank 58 extends toward one side of the vehicle and this side may be the left side as shown in Fig. 2. The sleeve 29 on the elongated operating lever 28 carries an arm 60 which projects outwardly to the left and then downwardly to a point aligned with the axis upon which the hollow member 27 is swingable. At the above mentioned point the arm 60 is connected through a link 61 to the leftwardly projecting arm of the bell crank 58. It should be apparent that turning of the handle 30 to one side or the other will transmit motion through the arm 60, the link 61, the bell crank 58, the link 59 and the drag link 57 to the respective arms 56 of the steering knuckles 54 so as to turn the front wheels 55 to the right or left in accordance with the direction in which the handle 30 is turned.

It is to be noted that my vehicle provides for application of force to propel the same by both the hands and feet, and enables the use of the hands for steering as well as propelling the vehicle. The elongated operating lever 28 may be removed from the hollow member 27 and the connection between the arm 60 and the link 61 may readily be arranged for disconnection. My vehicle is also arranged so that the same may be propelled either rearwardly or forwardly without changing the manner in which the hand and foot operated elements are used.

The transmission mechanism of my vehicle is also capable of functioning in the manner of free wheeling to permit coasting of the vehicle without the need for the hand and foot operated propulsion elements being in motion during such coasting. If the operating lever 28 is held in either its forwardmost or rearwardmost position the inclined elements 35a will hold the follower 32 in an outwardly displaced position so that the tooth 26b will be out of engagement with the gear 23. Accordingly the vehicle may coast without the necessity of movement of the lever 28. Also the vehicle may coast without movement of the lever 28 when the follower 32 is disposed at the outer side of the guide member 33.

It is apparent that I have invented a novel, compact, rugged, efficient and easily used vehicle adapted for propulsion by force applied by both the hands and feet arranged for steering by means of the element to which force is applied by the hands for propulsion purposes and arranged to permit a free wheeling action. It should be apparent that the vehicle described above is adapted for use not only as a toy vehicle for children, but also as a practical means of transportation for adults.

It will, of course, be understood that various changes may be made in the form, details, arrangement and proportions of the various parts without departing from the scope of my invention.

What is claimed is:—

1. Mechanical transmission apparatus including a rotatably mounted gear, a body movable in a path parallel to the periphery of said gear, means for oscillating said body in said path, an element carried by said body and shiftable relative thereto into and out of engagement with said gear, a follower carried by said element, an arcuate guide member extending parallel to said path and adapted for running of said follower alternatively at the inner and outer sides thereof to maintain said element correspondingly in and out of engagement with said gear, a pair of guide elements so swingably mounted at the respective ends of said guide member as to constitute extensions thereof angularly deflectable inwardly and outwardly relative to said gear, and means for yieldingly holding said guide elements respectively in inwardly and outwardly deflected angular positions whereby, during oscillatory movements of said body carrying said follower beyond the ends of said respective guide elements and then toward said guide member, each of said guide elements will deflect said follower from one side to the other of said guide member so that said follower will circumscribe said guide member responsive to oscillation of said body and place said gear-engaging element in engagement with said gear only during movements of said body in one direction, said holding means being shiftable to reverse the direction of deflection of the respective guide elements whereby the direction of movement of said body during which said gear-engaging element is engaged with said gear may be selectively determined.

2. Mechanical transmission apparatus including a rotatably mounted gear, a body movable in a path parallel to the periphery of said gear, means for oscillating said body in said path, an element carried by said body and shiftable relative thereto into and out of engagement with said gear, a follower carried by said element, an arcuate guide member extending parallel to said path and adapted for running of said follower alternatively at the inner and outer sides thereof to maintain said element correspondingly in and out of engagement with said gear, a pair of guide elements so swingably mounted at the respective ends of said guide member as to constitute extensions thereof angularly deflectable inwardly and outwardly relative to said gear, a control member shiftable between two positions thereof, resilient means so connecting said guide elements to said control member that one guide element will be yieldingly held in outwardly deflected position and the other in inwardly deflected position whereby, during oscillatory movements of said body carrying said follower beyond the ends of said respective guide elements and then toward said guide member, each of said guide elements will deflect said follower from one side to the other of said guide member so that said follower will circumscribe said guide member responsive to oscillation of said body and place said gear-engaging element in engagement with said gear only during movements of said body in one direction, said control member and said resilient means being so arranged that the directions of deflection of the respective guide elements for one position of said control member will be opposite to those for the remaining position of said control member.

3. Mechanical transmission apparatus including a rotatably mounted gear, a body movable in a path parallel to the periphery of said gear, means for oscillating said body in said path, an element carried by said body and shiftable relative thereto into and out of engagement with said gear, a follower carried by said element, an arcuate guide member extending parallel to said path and adapted for running of said follower alternatively at the inner and outer sides thereof to maintain said element correspondingly in and out of engagement with said gear, a pair of guide elements so swingably mounted at the respective ends of said guide member as to constitute extensions thereof angularly deflectable inwardly and outwardly relative to said gear, an actuating arm connected to each of said guide elements, a shiftable control member, resilient means so connected between said arms and said control member that said guide elements will be yieldingly held in respectively oppositely deflected positions and may be reversed as to directions of deflection by shifting said control member from one to another of its positions whereby, during oscillatory movements of said body carrying said follower beyond the ends of the respective guide elements and then toward said guide member, each of said guide elements will deflect said follower from one side to the other of said guide member so that said follower will circumscribe said guide member responsive to oscillation of said body and place said gear-engaging element in engagement with said gear only during movements of said body in one of its two directions of movement selectively determined by the position of said control member.

JOHN L. LORBESKI.